(12) United States Patent
Hartkopp

(10) Patent No.: US 7,605,802 B2
(45) Date of Patent: Oct. 20, 2009

(54) OPERATOR DEVICE WITH HAPTIC FEEDBACK

(75) Inventor: Oliver Hartkopp, Edemissen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 481 days.

(21) Appl. No.: 10/543,197

(22) PCT Filed: Jan. 21, 2004

(86) PCT No.: PCT/EP2004/000481

§ 371 (c)(1),
(2), (4) Date: Jul. 22, 2005

(87) PCT Pub. No.: WO2004/068259

PCT Pub. Date: Aug. 12, 2004

(65) Prior Publication Data

US 2006/0262084 A1 Nov. 23, 2006

(30) Foreign Application Priority Data

Jan. 31, 2003 (DE) ................................ 103 05 167
Mar. 31, 2003 (DE) ................................ 103 15 841

(51) Int. Cl.
*G09G 9/08* (2006.01)
(52) U.S. Cl. .................. 345/161; 345/87; 345/156; 345/157; 345/158; 345/173; 345/204
(58) Field of Classification Search .......... 345/156–167
See application file for complete search history.

(56) References Cited

U.S. PATENT DOCUMENTS

| 5,956,016 | A | * | 9/1999 | Kuenzner et al. | ........... 345/156 |
|---|---|---|---|---|---|
| 6,184,868 | B1 | * | 2/2001 | Shahoian et al. | ............ 345/161 |
| 6,211,861 | B1 | * | 4/2001 | Rosenberg et al. | .......... 345/163 |
| 6,337,678 | B1 | * | 1/2002 | Fish | ........................... 345/156 |
| 6,348,772 | B1 | * | 2/2002 | May | ........................... 318/430 |
| 6,410,866 | B1 | * | 6/2002 | Klein et al. | .................. 200/5 R |
| 6,429,849 | B1 | * | 8/2002 | An et al. | ..................... 345/161 |
| 7,084,854 | B1 | * | 8/2006 | Moore et al. | ................. 345/157 |
| 2003/0184574 | A1 | * | 10/2003 | Phillips et al. | .............. 345/702 |

FOREIGN PATENT DOCUMENTS

DE          196 09 390 A1     9/1997

(Continued)

OTHER PUBLICATIONS

English Language Translation of Japanese Examination Report dated Aug. 26, 2008.

*Primary Examiner*—Bipin Shalwala
*Assistant Examiner*—Vince E Kovalick
(74) *Attorney, Agent, or Firm*—Norris McLaughlin & Marcus, P.A.

(57) ABSTRACT

The invention relates to a control device (10) with haptic feedback, with at least one actuating element (12), at least one switching apparatus (14), and at least one positioning device (16), and uses of the inventive control device. The at least one actuating element (12) of the control device (10) with haptic feedback can be displaced with at least one degree of freedom and includes at least one display device (18). A force can be applied to the at least one actuating element (12) by the at least one positioning device (16).

22 Claims, 1 Drawing Sheet

FOREIGN PATENT DOCUMENTS

Figure 1:
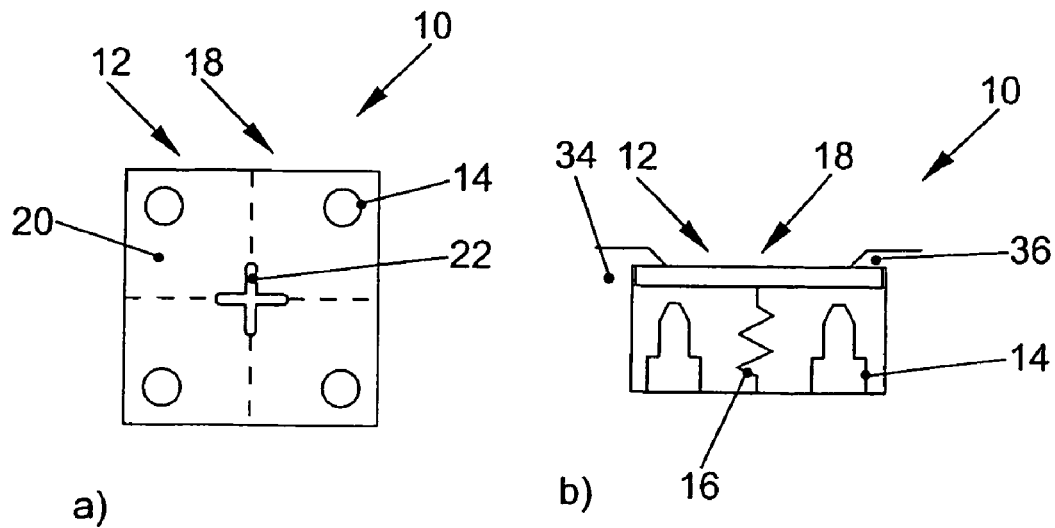

| | | |
|---|---|---|
| DE | 200 18 474 U1 | 1/2001 |
| DE | 199 59 702 A1 | 6/2001 |
| DE | 101 28 908 A1 | 12/2002 |
| EP | 1 010 585 A2 | 6/2000 |
| JP | 2002229708 A1 | 8/2002 |
| WO | 0195358 A2 | 12/2001 |

* cited by examiner

OPERATOR DEVICE WITH HAPTIC FEEDBACK

The invention is directed to a control device with haptic feedback and to the use of a control device with the features recited in the preambles of claims 1 and 21.

A number of different control devices for activating various switching functions are known in the art. Multifunction control devices with integrated displays can be implemented by integrating in the display device a touch sensor, for example a transparent touch-sensitive foil disposed on the display surface. Such control devices are used primarily, for example, in Personal Digital Assistants (PDA).

Disadvantageously, conventional control devices of this type are expensive, especially for small display sizes, and also do not include haptic feedback, which is particularly desirable for added operating safety if continuous visual contact with the display cannot be established. This is, in particular, necessary when operating an automobile and the like, or in other activities, where a visual display must be continuously observed, as may be important for safety reasons.

It is therefore an object of the present invention to obviate the aforedescribed disadvantages and to provide a control device which can be operated more safely than conventional devices and which can be flexibly employed in different applications.

The object is solved by the invention by a control device with the features recited in the preamble of claim 1. In particular, the control device according to the invention with haptic feedback includes at least one actuating element, at least one switching device and at least one positioning device. The at least one actuating element can be displaced with at least one degree of freedom. The at least one actuating element includes at least one display device. A force can be applied by the at least one positioning device to the at least one actuating element. The device of the invention represents a relatively inexpensive design, which offers improved display quality by eliminating a touch-sensitive foil. A particular advantage is a haptic feedback to an operating element of the control device, which can hence be handled more safely, as required in particular in the automotive field. The mechanical design also offers long-term stability.

According to a preferred embodiment of the invention, the at least one display device can be freely programmed. Advantageously, this approach allows highly flexible applications, in particular when employed as a multifunction control device.

According to another advantageous embodiment of the invention, the at least one display device can be programmed so that the available display area of the at least one display device can be divided into at least one display field. In this way, an arbitrary number of information or switching fields can be implemented, so that one or more control functions can be realized with the control device of the invention. Advantageously, at least one switching device can be associated with the at least one display field and can be activated by a force applied to the at least one actuating element or the at least one switching device in the region of the at least one display field. In this way, control functions and switching functions can advantageously be linked, so that a discrete number of switching functions can be implemented with the control device. In particular, when the at least one switching device is activated, haptic feedback can be provided, for example by pressure points or resilient forces of the switching device.

According to another advantage is embodiment of the invention, the at least one switching device can include a pushbutton, a switch, a touch-sensitive foil, and the like. The aforementioned elements can be easily integrated into the control device, so that a variety of switching functions can advantageously be implemented.

According to yet another advantageous embodiment of the invention, at least one graphic object can be displayed by the at least one display device, whereby the at least one graphic object can be an alphanumeric character, a graphic symbol, an image, and the like. In this way, a variety of optical information patterns can be designed for an easy comprehension of the displayed control functions.

According to yet another advantageous embodiment of the invention, the at least one positioning device can include a resilient element, a rubber cross, an electromechanical actuator, a pneumatic actuator, a piezoelectric actuator, and the like. The control device according to the invention can be particularly easily implemented with the aforedescribed elements. In particular, the at least one activating element can return to its initial state. Advantageously, a haptic guiding function for the selection of the at least one graphic object can be readily implemented by using a resilient element in form of a rubber cross, wherein the rubber cross exerts a small opposing force in the region of the at least one display field while the at least one actuating element is activated.

According to another advantageous embodiment of the invention, the control device can include a hollow body with at least one opening, whereby the at least one actuating element can be guided in the hollow body in at least one spatial direction. The control device can thus be implemented and operated in a simple manner. Advantageously, the movement of the at least one actuating element in the at least one spatial direction is limited by a limit stop element. Advantageously, this defines a reproducible home position of the at least one actuating element. The at least one limit stop element can be implemented, for example, as a protrusion or as an electromechanical actuator.

In another advantageous embodiment of the invention, the control device can be integrated in an operator island. This offers many advantageous applications of the control device, which can be easily arranged in functional groups. Advantageously, the operator island can include at least one operating element, whereby the at least one operating element can be a pushbutton, a switch, a knob, and the like. Many simple control functions can be implemented in this way. Advantageously, at least one function of the at least one operating element and/or at least one state of the at least one operating element can be visualized on the at least one display device. This provides a particularly high degree of operational safety.

According to another advantageous embodiment of the invention, the at least one display device can include at least one auxiliary touch sensor that supports the selection on the touchpad, whereby the at least one auxiliary touch sensor can be formed as an indentation and/or a raised portion of the display surface of the at least one display device. This provides a particularly high degree of safety in the operation, in particular when visual contact with the control device is limited. Advantageously, the at least one auxiliary touch sensor is formed as a point, a line, a rubber cross, a plastic cross, and the like, which produces an auxiliary touch sensor with favorable haptic properties.

According to yet another advantageous embodiment of the invention, the at least one display device can be circular, polygonal, and the like. The resulting large number of design options can provide particularly advantageous properties for the intended applications.

Finally, according to an advantageous embodiment of the invention, the at least one display device can include a liquid crystal display (LCD), a light emitting diode (LED), an organic light emitting diode (OLED), a light emitting diode array, an array of organic light emitting diodes, and the like. This advantageously minimizes power consumption and requires only a very small installation space. In addition, the means of the invention facilitate different designs of the at least one display device.

Advantageously, the control element according to the invention can be used as a control element for automobiles, airplanes, ships, and the like, because these areas have many applications, where a safe operation of the control elements is of particular advantage.

Moreover, the control element according to the invention can advantageously be used as a control element for window lifters, childproofing, illumination devices, climate controls, audio systems, video systems, telephone systems, gearshift selectors, sunroofs, ventilator roofs, solar roofs, vehicle seats, computer systems, and the like, because the inherent flexibility of the control element is particularly advantageous for the aforementioned applications.

Additional preferred embodiments of the invention are recited as additional features in the dependent claims.

Exemplary embodiments of the invention will be described below in more detail with reference to the corresponding drawings. It is shown in:

FIG. 1a a front view of a control device with haptic feedback;

FIG. 1b a side view of a control device with haptic feedback; and

Figure 2:
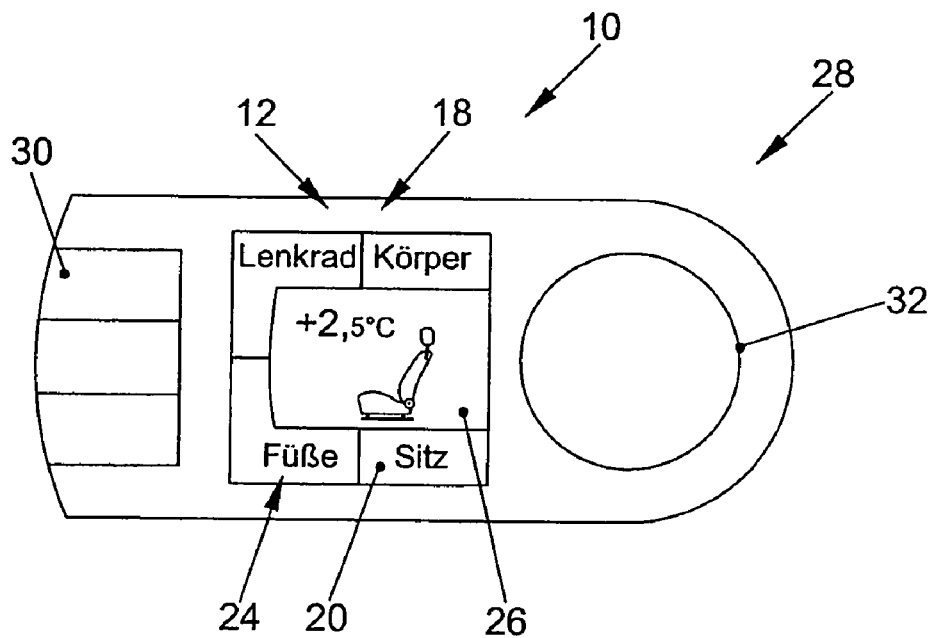

FIG. 2 a control device for climate control, which is integrated in an operator island, during operation.

FIG. 1 shows schematically a front view (FIG. 1a) and a side view (FIG. 1b) of an embodiment of a control device 10 according to the invention. The control device 10 includes an actuating element 12, which is guided for vertical movement inside a hollow body 34 with an opening, with a display device 18, wherein the vertical movement is restricted to along the vertical by two limits stop elements 36 implemented as projections, as shown in FIG. 1b. The actuating element 12 is held in a home position by a positioning device 16 (FIG. 1b), which is implemented as a resilient element in form of a rubber cross 22 (FIG. 1a) arranged below the actuating element. The actuating element 12 can be displaced with one translatory degree of freedom and two rotational degrees of freedom by a force exerted on the actuating element 12. The translatory degree of freedom is provided by the vertical line shown in FIG. 1b. The rotation axes of the two rotational degrees of freedom are formed by two mutually orthogonal straight lines which are located in a plane parallel to the front side of the actuating element 12. The two straight lines extend parallel to the respective sides of the actuating element 12 and thus form the separation lines between four display fields 20, into which the display surface of the display device 18 is divided, as shown in FIG. 1a. When pressure is applied to the actuating device 12 in the region of one of the four display fields 20, then the actuating element 12 perform simultaneously two rotary motions and one translatory motion. The corner of the actuating element 12 closest to the corresponding display field 20 is lowered in the direction of the switching device 14 that is associated with this display field 20, whereby the switching device 14 is implemented as a pushbutton. When a corresponding force is applied to the actuating device 12, so that the respective region of the actuating device 12 is lowered sufficiently so as to trigger the switching function, then the corresponding switching device 14 is activated. Implementation of the resilient element as a rubber cross 22 (FIG. 1a) advantageously provides a guiding function, whereby the motion of the actuating element 12 is steered into the direction of the display field 20 or the corresponding switching device 14 positioned closest to the activation location. The control means of the invention improve the operating safety over that of current devices, so that the control device 10 can be reliably operated in particular when visual contact is limited or nonexistent.

FIG. 2 shows a control device 10 according to the invention for climate control in an automobile, wherein the control device 10 is integrated in an operator island 28, with an actuating element 12 and a display device 18, which is connected with the actuating element 12 and is freely programmable. In the depicted exemplary embodiment, the display surface of the display element 18 is divided into five display fields 20 and 26, which can represent different functions of the control device 10. The display fields 20 can display associated functions as graphic objects 24 in form of alphanumeric symbols. The display fields 20 form so-called soft keys. These are multifunction control elements which can be assigned and modified by software in any desired manner. As shown in FIG. 2, the temperature controls for the steering wheel, body, floor space, and seat are assigned to these display fields 20 and can be selected and activated by pressing on the actuating element 12 in the area of the respective display field 20. When one of the functions associated with the display fields 20 is activated, the corresponding function is visualized in one additional display field 26 by graphic objects. In the exemplary embodiment depicted in FIG. 2, the activated function represents the temperature control for a seat heater. The desired temperature can be changed by an operating element 32 implemented as a knob and located on the operator island 28. The area of the associated display field 26 extends to the edge of the actuating element 12 adjacent to the operating element 32, so that the operating element 32 can be unmistakably associated with the corresponding function selected by the user. The operator island 28 includes three additional operating elements 30 implemented as pushbuttons, and corresponding switching function can be assigned to these pushbuttons. The control device 10 according to the invention provides a high degree of operating safety and flexibility at relatively low cost, which opens up numerous applications.

LIST OF REFERENCE SYMBOLS 10 control device
12 actuating element
14 switching device
16 positioning device
18 display device
20 display field
22 rubber cross
24 graphic object
26 display field with graphic objects
28 operator island
30 operating element
32 operating element
34 hollow body
36 limits stop element

The invention claimed is:

1. Control device with haptic feedback with at least one actuating element, at least one switching device and at least one positioning device, wherein the at least one actuating element can be displaced in at least one degree of freedom and comprises at least one region, wherein the at least one actuating element is adapted to move inward with respect to the at least one switching device when the at least one actuating element is activated, the at least one actuating element includes at least one display device comprising at least one display field corresponding to the at least one region of the at least one actuating element, wherein the at least one switching device is associated with the at least one display field of the at least one display device, wherein at least one function of the at least one actuating element can be visualized with the at least one display device, and the at least one switching device is adapted to provide haptic feedback to the at least one actuating element when the at least one switching device is activated by movement of the at least one actuating element.

2. Control device according to claim 1, wherein the at least one display device can be freely programmed.

3. Control device according to claim 1, wherein the at least one display device is programmed so that the available display area of the at least one display device can be divided into at least one display field.

4. Control device according to claim 3, wherein the at least one switching device can be associated with the at least one display field and can be activated by a force applied to the at least one actuating element or the at least one switching device in the region of the at least one display field.

5. Control device according to claim 1, wherein the at least one switching device is selected from the group consisting of a pushbutton, a switch, and a touch-sensitive foil.

6. Control device according to claim 1, wherein at least one graphic object can be displayed by the at least one display device.

7. Control device according to claim 6, wherein the at least one graphic object represents an alphanumeric character, a graphic symbol or an image.

8. Control device according to claim 6, wherein the at least one display device includes at least one auxiliary touch sensor that supports selection of the at least one graphic object displayable by the at least one display device.

9. Control device according to claim 8, wherein the at least one auxiliary touch sensor is formed as an indentation and/or a raised portion of a display surface of the at least one display device.

10. Control device according to claim 8, wherein the at least one auxiliary touch sensor is formed as a point, a line, a rubber cross or a plastic cross.

11. Control device according to claim 1, wherein the at least one positioning device is selected from the group consisting of a resilient element, a rubber cross, an electromechanical actuator, a pneumatic actuator, and a piezoelectric actuator.

12. Control device according to claim 1, wherein the control device comprises a hollow body with at least one opening.

13. Control device according to claim 12, wherein the at least one actuating element is guided in the hollow body in at least one spatial direction.

14. Control device according to claim 13, wherein the movement of the at least one actuating element in the at least one spatial direction is limited by a limit stop element.

15. Control device according to claim 1, wherein the control device is integrated in an operator island.

16. Control device according to claim 15, wherein the operator island includes at least one operating element.

17. Control device according to claim 16, wherein the at least one operating element is selected from the group consisting of a pushbutton, a switch, and a knob.

18. Control device according to claim 16, wherein at least one function of the at least one actuating element can be visualized with the at least one display device.

19. Control device according to claim 1, wherein the at least one display device is circular or polygonal.

20. Control device according to claim 1, wherein the at least one display device is selected from the group consisting of a liquid crystal display, a light emitting diode, an organic light emitting diode, a light emitting diode array, and an array of organic light emitting diodes.

21. Control device according to claim 1, wherein the at least one positioning device is adapted to provide a haptic guiding function to the at least one actuating element by exerting an opposing force in the at least one region of the at least one actuating element when the at least one actuating element is activated.

22. Control device with haptic feedback with at least one actuating element, at least first and second switching devices and at least one positioning device, wherein the at least one actuating element is displaceable in at least one degree of freedom and comprises at least first and second regions, wherein the first region is a different region than the second region, and the at least one actuating element includes at least one display device comprising at least first and second display fields, wherein the first display field corresponds to the first region of the at least one actuating element and is associated with the first switching device, and further wherein the second display field corresponds to the second region of the at least one actuating element and is associated with the second switching device.

* * * * *